(12) United States Patent
Balter et al.

(10) Patent No.: US 12,067,104 B2
(45) Date of Patent: Aug. 20, 2024

(54) SYSTEMS AND METHODS FOR DATA SECURITY WITHIN POWER TOOLS

(71) Applicant: Hilti Aktiengesellschaft, Schaan (LI)

(72) Inventors: Marco Balter, Feldkirch (AT); Rainer Rudigier, Thüringen (AT)

(73) Assignee: Hilti Aktiengesellschaft, Schaan (LI)

( * ) Notice: Subject to any disclaimer, the term of this patent is extended or adjusted under 35 U.S.C. 154(b) by 248 days.

(21) Appl. No.: 17/762,501

(22) PCT Filed: Sep. 23, 2020

(86) PCT No.: PCT/EP2020/076495
§ 371 (c)(1),
(2) Date: Mar. 22, 2022

(87) PCT Pub. No.: WO2021/058522
PCT Pub. Date: Apr. 1, 2021

(65) Prior Publication Data
US 2022/0358202 A1    Nov. 10, 2022

Related U.S. Application Data

(60) Provisional application No. 62/905,722, filed on Sep. 25, 2019.

(51) Int. Cl.
*G06F 21/44* (2013.01)
*G06F 21/64* (2013.01)

(52) U.S. Cl.
CPC .............. *G06F 21/44* (2013.01); *G06F 21/64* (2013.01)

(58) Field of Classification Search
CPC .................................. G06F 21/44; G06F 21/64
See application file for complete search history.

(56) References Cited

U.S. PATENT DOCUMENTS

| | | | |
|---|---|---|---|
| 9,009,475 B2 * | 4/2015 | Hauck | H04L 9/30 713/168 |
| 2005/0069137 A1 * | 3/2005 | Landrock | G07F 7/1008 380/278 |
| 2015/0149569 A1 | 5/2015 | Feltham et al. | |
| 2017/0149569 A1 * | 5/2017 | Prabhu | G06F 21/629 |
| 2020/0052905 A1 * | 2/2020 | Mathias | H04L 9/0861 |
| 2020/0277847 A1 * | 9/2020 | Rojas | G06Q 10/20 |
| 2021/0091930 A1 * | 3/2021 | Visoky | G05B 19/4185 |
| 2021/0288811 A1 * | 9/2021 | Shin | H04L 63/0853 |

(Continued)

FOREIGN PATENT DOCUMENTS

EP    3 292 969 A2    3/2018

OTHER PUBLICATIONS

International Searching Authority, International Search Report and Written Opinion in International Application No. PCT/EP2020/076495, mailed Nov. 27, 2020.

*Primary Examiner* — Stephen T Gundry
(74) *Attorney, Agent, or Firm* — Leydig, Voit & Mayer, Ltd.

(57) ABSTRACT

A method is provided, the method comprising generating a data package, by control circuitry of a power tool; generating a unique signature for the data package with a private key, wherein the private key is generated by a secure element of the power tool, and wherein the secure element is a digital key storage unit; and transmitting the signed data package to an auxiliary device for verification.

4 Claims, 4 Drawing Sheets

(56) References Cited

U.S. PATENT DOCUMENTS

| | | | | |
|---|---|---|---|---|
| 2021/0409232 | A1* | 12/2021 | Danilchenko | H04W 12/043 |
| 2022/0058269 | A1* | 2/2022 | Voicu | H04W 12/35 |
| 2022/0141001 | A1* | 5/2022 | Mondello | H04W 12/069 |
| | | | | 713/171 |
| 2022/0164455 | A1* | 5/2022 | Jeanson | G06Q 50/02 |
| 2022/0197490 | A1* | 6/2022 | Feinstein | G01V 1/34 |
| 2022/0200789 | A1* | 6/2022 | Lalande | H04L 9/085 |
| 2022/0277650 | A1* | 9/2022 | Mondello | H04W 4/40 |
| 2022/0337435 | A1* | 10/2022 | Kaufmann | H04L 9/3278 |
| 2022/0405429 | A1* | 12/2022 | Balter | G06F 21/73 |
| 2023/0025127 | A1* | 1/2023 | Duval | H04L 9/0866 |
| 2023/0108733 | A1* | 4/2023 | He | H04L 67/52 |
| | | | | 709/223 |
| 2023/0110131 | A1* | 4/2023 | Smith | H04L 67/1046 |
| | | | | 370/254 |
| 2023/0111457 | A1* | 4/2023 | Dobbins | H04W 12/03 |
| | | | | 713/170 |
| 2023/0252553 | A1* | 8/2023 | Hecht | G06Q 30/0633 |
| | | | | 705/26.8 |
| 2023/0376873 | A1* | 11/2023 | Foubert | E21B 41/00 |

\* cited by examiner

Fig. 3
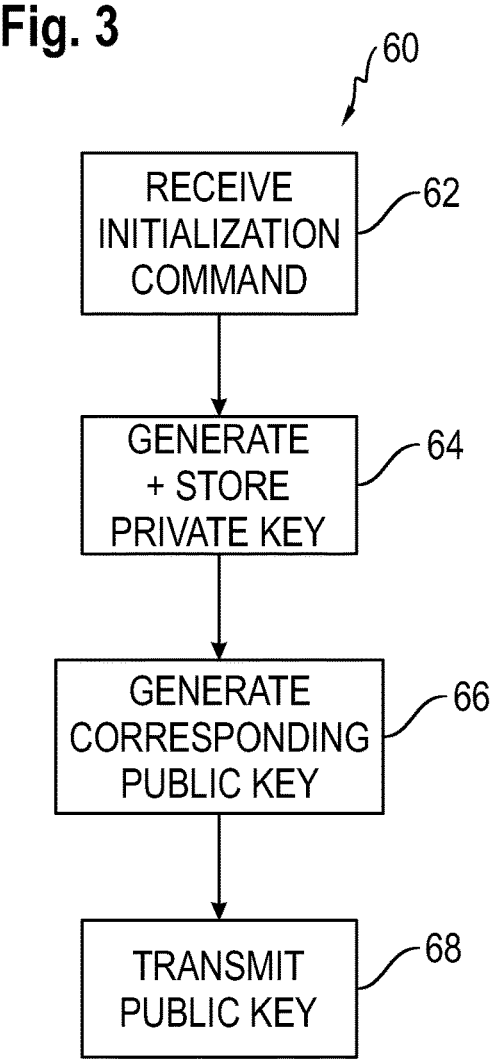
Fig. 4
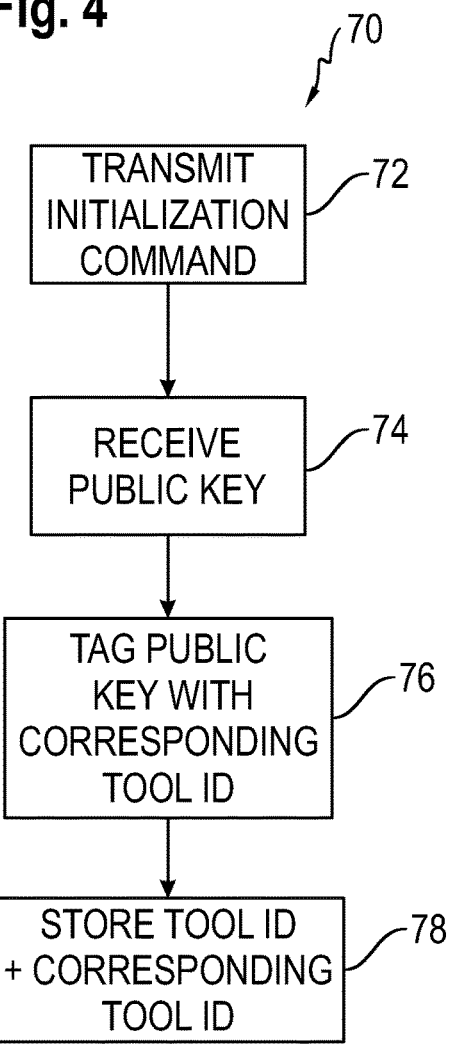
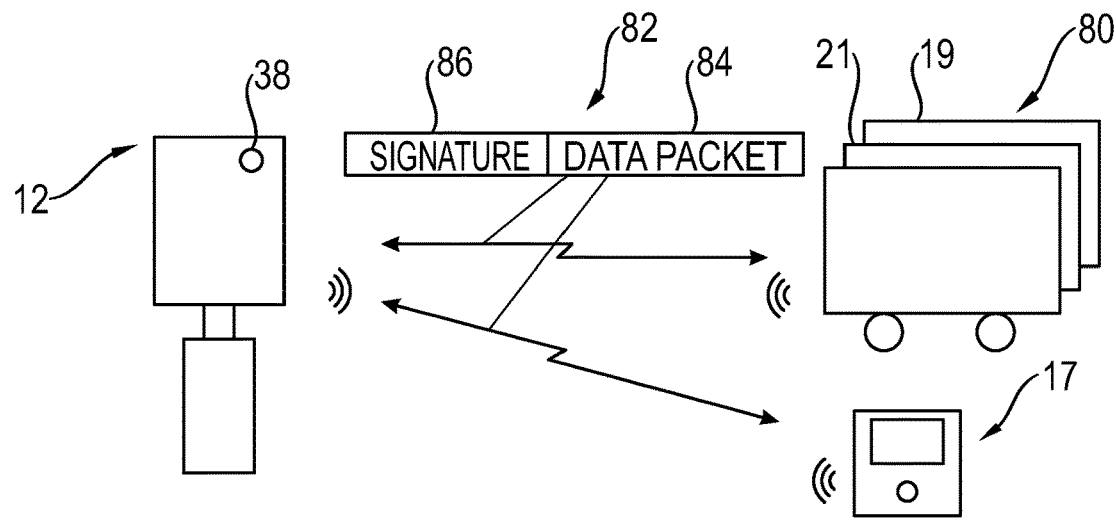
Fig. 5

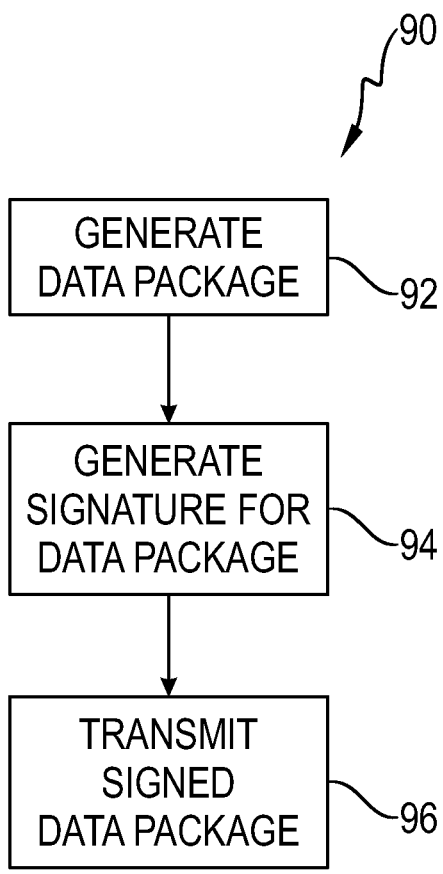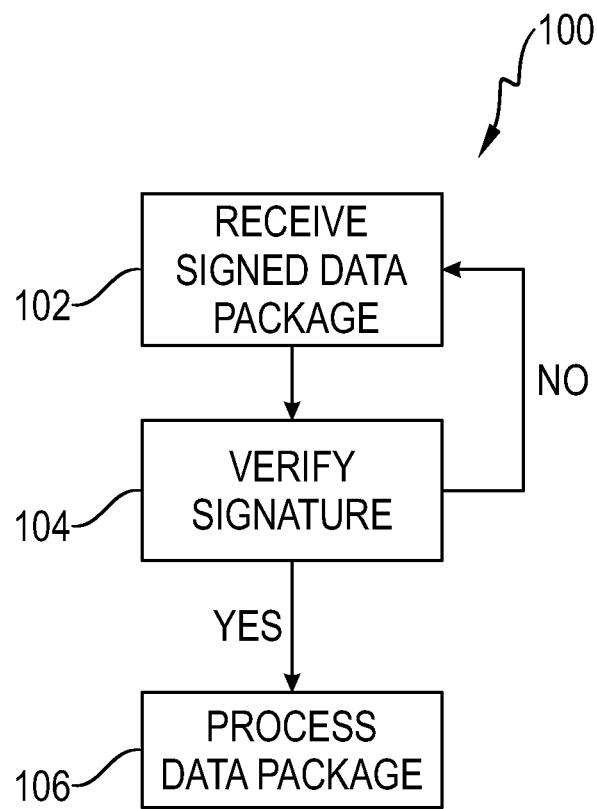
Fig. 6
Fig. 7

SYSTEMS AND METHODS FOR DATA SECURITY WITHIN POWER TOOLS

CROSS-REFERENCE TO RELATED APPLICATIONS

This patent application is the U.S. National Stage of International Patent Application No. PCT/EP2020/076495, filed Sep. 23, 2020, which claims the benefit of U.S. Patent Application No. 62/905,722, filed Sep. 25, 2019, which are each incorporated by reference.

BACKGROUND

The present disclosure relates generally to the field of power tools, and more particularly to data security within power tools.

Within the construction industry, drilling systems are typically utilized to create holes or through-formations within mineral materials (e.g., concrete, brickwork, etc.). Drilling systems may include a core drill, and one or more auxiliary devices that provide support for the core drill. For example, in certain configurations, a machine stand, a feed device, a water management device, a vacuum and/or a suction device may be utilized as auxiliary devices for the core drill. In certain situations, drilling systems may include a computing device (e.g., mobile computing device) that is configured to support the core drill and the auxiliary devices.

During operation of the drilling system, each component of the system may communicate operating commands, sensor information, parameters, data, or other types of information to another component of the system. It may be beneficial to include systems and methods within the components of the drilling system to enable data security for these types of communications, such that the information sent and received is reliable and trustworthy.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, systems and methods for data security with power tools are provided. The systems and methods include a power tool that generates a data package, and a secure element of the power tool that generates a unique signature for the data package with a private key. The power tool transmits the signed data package to an auxiliary device. The auxiliary device receives the signed data package, and verifies the unique signature by comparing the unique signature to a public key corresponding to the private key of the power tool. With a positive verification, the auxiliary device processes the signed data package.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 3 is a method of an embodiment of the data security system of FIG. 2, where a secure element of the core drill generates the private key and the corresponding public key;

FIG. 4 is a method of an embodiment of the data security system of FIG. 2, where computing devices receive a public key and store the public key with a corresponding tool ID;

FIG. 5 is a schematic of an embodiment of the drilling system of FIG. 1, where the core drill transmits a signed data package to an auxiliary device;

FIG. 6 is a method of an embodiment of the drilling system of FIG. 5, where the core drill generates and transmits a signed data package; and FIG. 7 is a method of an embodiment of the drilling system of FIG. 5, where the auxiliary device receives and verifies the signed data package.

DETAILED DESCRIPTION

Figure 1:
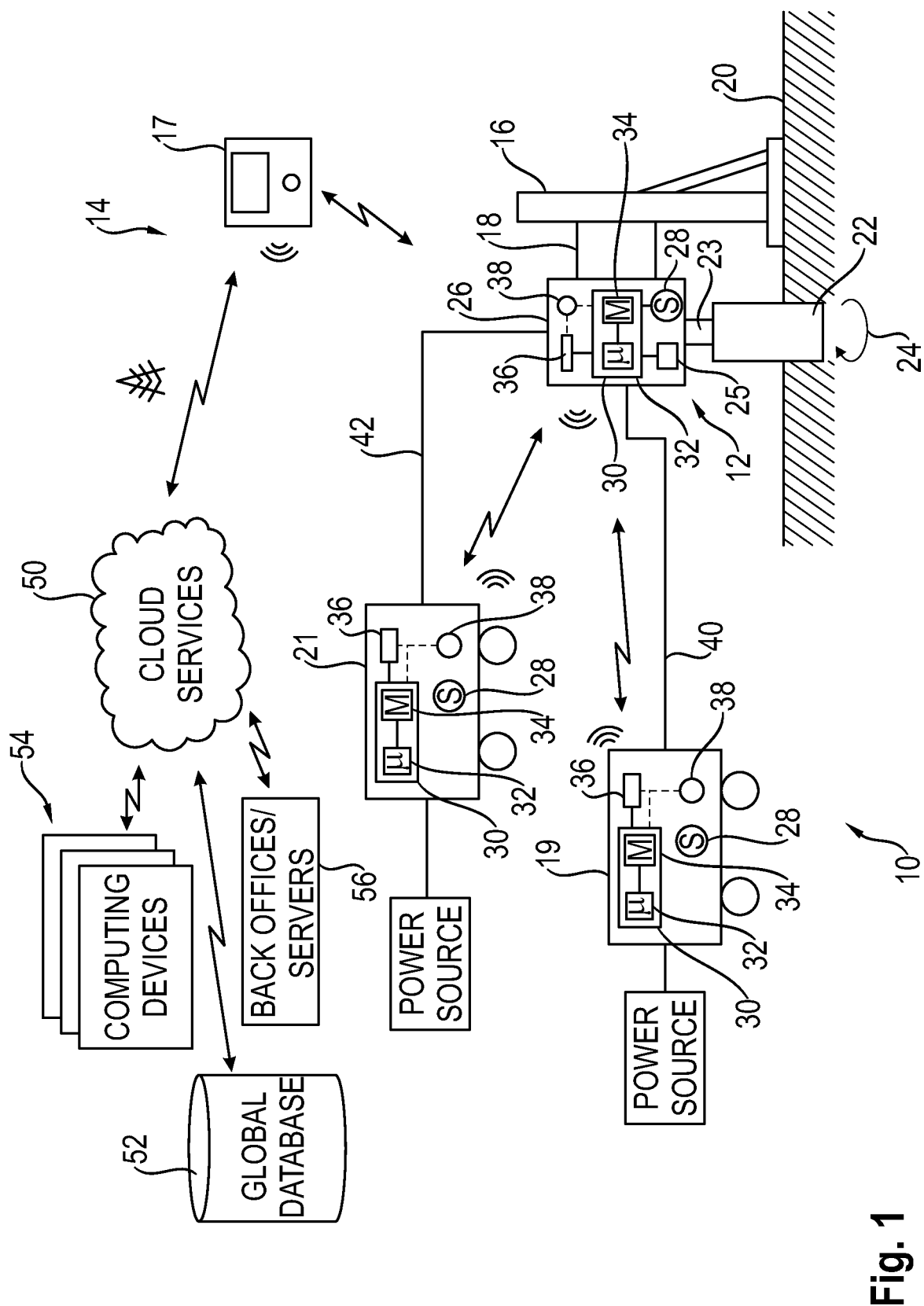
FIG. 1 is a schematic of an embodiment of a drilling system, where the drilling system includes a core drill, one or more auxiliary devices, and a data security system.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

In certain embodiments of the present disclosure, a drilling system may include systems and methods for enabling data security for communications generated or received by components of the drilling system. The drilling system may include a core drill and one or more auxiliary devices communicatively and operatively coupled to the core drill. The auxiliary devices may include one or more of a machine stand, a feed device, a water management device, a vacuum, a suction device, a mobile computing device, a computing device (e.g., back office computers, servers, manufacturing equipment, cloud services, databases, etc.), or any similar device. In certain embodiments, information, such as operating commands, operating parameters, drive signals, input/out signals, sensor information, motor control, lock-down commands, ON/OFF, current or historical data, etc., may be communicated between the components of the drilling system.

For example, in certain embodiments, the core drill may generate information that is communicated to one or more auxiliary devices. In some embodiments, the auxiliary device may generate information that is communicated to the core drill and/or one or more auxiliary devices. In certain embodiments, the core drill may generate information that is communicated to cloud services (or other remote computing devices) via a mobile computing device. It may be beneficial to include systems and methods within the components of the drilling system to enable data security for these and other types of communications, such that the information sent and received is reliable and trustworthy. Accordingly, FIGS. 1-7 describe systems and methods for a drilling system with a data security system configured to securely transmit and receive communications between one or more components of the drilling system, as further described in detail below.

Turning now to the drawings, FIG. 1 is a schematic of an embodiment of a drilling system 10, where the drilling system 10 includes a core drill 12, one or more auxiliary devices, and a data security system 14. The core drill 12 may be configured to cut holes or form through-formations within various materials (e.g., concrete, cement, brickwork, etc.). The drilling system 10 may include various auxiliary devices that provide operating support for the core drill 12. In the illustrated embodiment, the auxiliary devices include a machine stand 16, a feed device 18, a water management device 19, a suction device 21, and a mobile computing device 17. It should be noted that in other embodiments, various other auxiliary devices may be utilized within the drilling system 10.

In certain embodiments, the drilling system 10 may include a machine stand 16 for supporting the core drill 12. The drilling system 10 may also include a feed device 18 for moving the core drill 12 along the length of the machine stand 16. The machine stand 16 may be secured to the substrate 20 with one or more fastening means (e.g., screws, bracing, etc.). In this manner, the core drill 12 may be moved towards or away from the substrate material 20 to form holes (e.g., boreholes) within the substrate 20 (e.g., concrete, cement, brickwork, etc.). Specifically, the core drill 12 may include a drill bit 22 connected to an output shaft 23. The drill bit may be configured to engage the substrate 20 in a rotational direction 24 to create the holes. The output shaft 23 may rotate in the rotational direction 24, and may be driven by a drive unit 25 disposed within a housing 26 of the core drill 12.

In certain embodiments, the core drill 12 includes various components disposed within the housing 26. For example, the core drill 12 may include control circuitry 30 communicatively coupled to a processor 32, a memory 34, one or more sensors 28, the drive unit 25, and a communications circuitry 36. The control circuitry 30 may be configured to control operations of the core drill 12, such as operating parameters of the drive unit and motor 25 and the output shaft 23. The control circuitry 30 may be configured to regulate other parameters of the core drill 12, such as a speed, torque, contact force, modes of operation (e.g., economy mode, high-performance mode, etc.), type of drill bit 22 selected, ON/OFF commands, a status of the drill, and other operating parameters. The one or more sensors 28 may be communicatively and operatively coupled to the control circuitry 30, and may be configured to provide feedback (e.g., measured value) on the various operating parameters. For example, the sensors 28 may be safety sensors, position and/or orientation sensors, touch sensors, pressure sensors, accelerometers, temperature sensors, proximity and displacement sensors, image sensors, level sensors, gyroscopes, force sensors, speed sensors, etc. Each of the one or more sensors 28 may be configured to provide a measure value related to the core drill 12 (e.g., a speed, a contact force, a position and/or orientation, and so forth), to the control circuitry 30. In certain embodiments, the control circuitry 30 may operate in a feedback loop based in part on the information provided by the sensors 28.

In certain embodiments, the control circuitry 30 may be communicatively coupled to the processor 32 and the memory 34. The processor 32 may be configured to execute instructions stored on the memory 34 to carry out the functions of the core drill 12. The memory 34 may be configured to store instructions that are loadable and executable on the processor 32. In certain embodiments, the memory 34 may be volatile (such as a random access memory (RAM)) and/or non-volatile (such as read-only memory (ROM), flash memory, etc.). The control circuitry 30 may also include additional removable storage and/or non-removable storage including, but not limited to, magnetic storage, SD card, flash storage, USB storage, optical disks, and/or tape storage. In some implementations, the memory 34 may include multiple different types of memory, such as static random access memory (SRAM), dynamic random access memory (DRAM), or ROM.

In certain embodiments, the memory 34 may be configured to store information related to the core drill 12 and/or other components of the drilling system 10. For example, the memory 24 may store unique identification information related to the core drill 12, unique identification information related to the manufacturer, owner, and/or previous owners of the core drill 12, historical information related to the operation of the core drill 12 (e.g., runtime), error codes or alerts triggered, historical information related to the repair and/or theft, sensor information gathered from one or more sensors 28, information related or received from the auxiliary devices, drive signals provided by the control circuitry 30 and/or input signals provided by operator, the general state of the health of the core drill 12, and/or other types of information. In particular, the memory 24 may be configured to store any type of information that is useful to operate the core drill 12 and other components of the drilling system 10.

The control circuitry 30 may be communicatively coupled to the communications circuitry 36 disposed within the housing 26. In certain embodiments, the control circuitry 30 may be configured to generate data packages of information that are wirelessly transmitted by the communications circuitry 36 to an auxiliary device, a remote computing device (e.g., server/mobile phone) and/or a mobile computing device (e.g., smartphone). In certain embodiments, the communications circuitry 36 may be enabled to transmit information via one or more different wireless modes of operation, such as, but not limited to, Bluetooth, Near Field Communication (NFC), Wifi, ZigBee, LoRa, LoRaWAN, Sigfox, Cellular, etc. As noted above, it may be beneficial to include systems and methods within the components of the drilling system 10 to enable data security for these and other types of transmissions, such that the data packages sent and received is reliable and trustworthy. In certain embodiments, the control circuitry 30 and the communications circuitry 36 may be communicatively coupled to a secure element 38. The secure element 38 may be configured to sign the data packages generated by the control circuitry 30 of the core drill 12, so that they may be authenticated later by components of the drilling system 10 (e.g., the water management device 19, the suction device 21, the mobile computing device 17, etc.), as further described by FIGS. 3-4.

As noted above, the drilling system 10 may include one or more auxiliary devices, including the water management device 19, the suction device 21, and the mobile computing device 17. In certain embodiments, the water management device 19 may be operatively connected to the core drill 12 with a hose 40, and may be configured to supply the core drill 12 with a source of water. The water may be guided to the drilling area with the hose 40. In certain embodiments, the water management device 19 may include a dust or a water suction, and a water pump. In particular, the water management device 19 may include its own control circuitry 30, the processor 32, the memory 34, one or more sensors 28, the communications circuitry 36, and the secure element 38. The one or more sensors 28 of the water management device 19 may measure a water volume, a water flow, an activation or deactivation of the water management device 19, an operation of the water pump, and other operating parameters. The sensors 28 of the water management device 19 may be configured to provide the measured information to the control circuitry 30 of the water management device 19. The control circuitry 30 may generate data packages of this information to wirelessly share (via the communications circuitry 36) to the core drill 12 and/or one or more other components of the drilling system 10. The secure element 38 may be configured to sign the data packages generated by the control circuitry 30 of the water management device 19, so that they may be authenticated later by components of the drilling system 10 (e.g., the core drill 12, the mobile computing device 17, etc.), as further described by FIGS. 3-4.

In certain embodiments, the drilling system 10 includes the suction device 21, which may be operatively connected to the core drill 12 with a second hose 42. During the drilling process, waste products may be generated in and around the drilling area. The suction device 21 may be configured to remove the waste products from the drilling area, via the second hose 42, so that the drilling process is not hindered by accumulating waste products. In particular, the suction device 21 may include its own control circuitry 30, the processor 32, the memory 34, one or more sensors 28, the communications circuitry 36, and the secure element 38. The one or more sensors 28 of the suction device 21 may measure a pressure of suction, a force, an activation or deactivation of the suction device 21, a capacity of waste product storage within the suction device 21, and other operating parameters. The sensors 28 of the suction device 21 may be configured to provide the measured information to the control circuitry 30 of the suction device 21. The control circuitry 30 may generate data packages of this information to wirelessly share (via the communications circuitry 36) to the core drill 12 and/or one or more other components of the drilling system 10. The secure element 38 may be configured to sign the data packages generated by the control circuitry 30 of the suction device 21, so that they may be authenticated later by other components of the drilling system 10 (e.g., the core drill 12, the mobile computing device 17, etc.), as further described by FIGS. 3-4.

In certain embodiments, the communications circuitry 36, may be configured to wirelessly transmit information from the core drill 12, the water management device 19 and/or the suction device 21 to an external computing device, such as a mobile computing device 17, a tablet, a desktop computer, or any other processor enabled device. One or more different modes of operation may be utilized, such as, but not limited to, Bluetooth, Near Field Communication (NFC), Wifi, ZigBee, LoRa, LoRaWAN, Sigfox, Cellular, etc. The mobile computing device 17 may include a transceiver that is configured to communicate information received to a cloud-based computing system 50 via WiFi (e.g., Institute of Electrical and Electronics Engineers [IEEE] 802.11X, cellular conduits (e.g., high speed package access [HSPA], HSPA+, long term evolution [LTE], WiMax), near field communications (NFC), Bluetooth, personal area networks (PANs), and the like. The cloud-based computing device 50 may be a service provider providing cloud analytics, cloud-based collaboration and workflow systems, distributed computing systems, expert systems and/or knowledge-based systems. In certain embodiments, the cloud-based computing device 50 may be a data repository that is coupled to an internal or external global database 52.

Further, in certain embodiments, the global database 52 may allow computing devices 54 to retrieve information stored within for additional processing or analysis. Indeed, the cloud-based computing device may be accessed by a plurality of systems (computing devices 54 and/or computing devices from back offices/servers 56) from any geographic location, including geographic locations remote from the physical locations of the systems. Accordingly, the cloud-based computing system 50 may enable advanced collaboration methods between parties in multiple geographic areas, provide multi-party workflows, data gathering, and data analysis, which may increase the wireless capabilities of connectivity and communications of the drilling system 10.

In particular, the mobile computing device 17 may be configured to receive signed data packages generated by the core drill 12, the water management device 19, and/or the suction device 21. For example, the control circuitry 30 of the core drill 12 may be configured to generate a data package of the information intended to be transmitted from the core drill 12. Further, based on a private key generated by the secure element 38 of the core drill 12, the control circuitry 30 may be configured to sign the generated data package of information, before transmitting the data package wirelessly via the communications circuitry 36. Upon receiving the signed data package, the mobile computing device 17 (other any other component of the drilling system 10 that receives the data package) may authenticate the data package with a public key that corresponds to the private key to ensure that it was generated by the intended device. In certain embodiments, the mobile computing device 17 may utilize the cloud-based computing system 50 to compare the public and private keys, as further described with respect to FIGS. 6 and 7. These and other features of the data security system 14 incorporated into the drilling system 10 are described in further detail in FIGS. 3-4.

Figure 2:
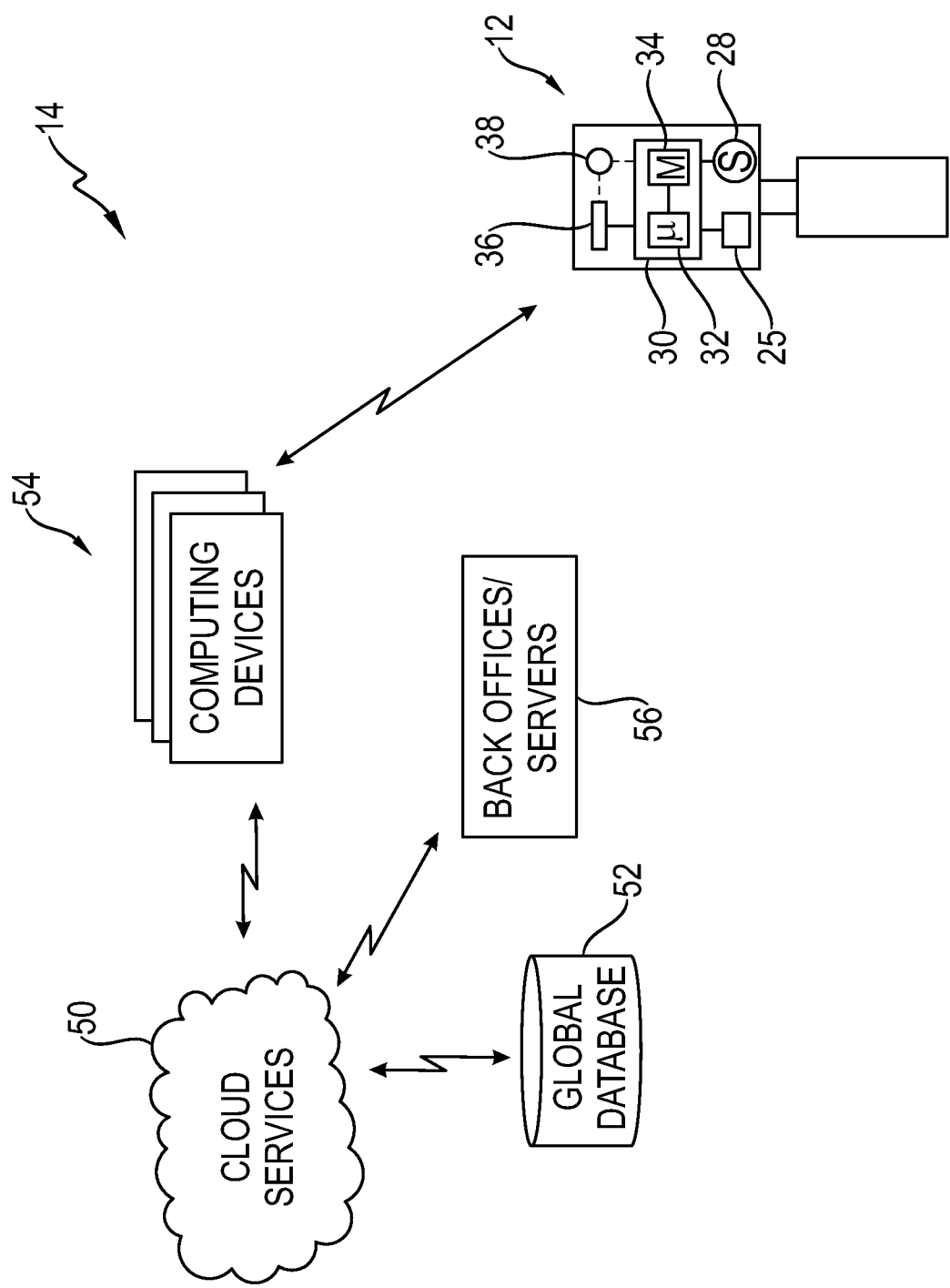
FIG. 2 is a schematic of an embodiment of the data security system of FIG. 1, where the data security system generates a private key and a corresponding public key for the core drill.

FIG. 2 is a schematic of an embodiment of the data security system 14 of FIG. 1. During a manufacturing process, the secure element 38 may be disposed within a component of the drilling system 10. The secure element 38 may be a physical secure hardware key storage, and may be disposed within (or communicatively coupled) to the control circuitry 30 of the component of the drilling system 10. For example, in the illustrated embodiment, the secure element 38 is communicatively coupled to the control circuitry 30 (and the processor 32 and memory 34). In certain embodiments, the data security system 14 may include a plurality of secure elements 38, where each secure element 38 is disposed within a component of the core drilling system 10. In the illustrated embodiment, the secure element 38 disposed within the core drill 12 is utilized an exemplary embodiment. However, it should be noted that these systems and methods may be applicable to other components of the drilling system 10 with the secure element 38.

During the manufacturing process, the secure element 38 may be initialized by one or more computing devices 54. In certain embodiments, the computing devices 54 may be remote from the field, and may be in a manufacturing plant. In certain embodiments, the computing device 54 may be a mobile computing device (e.g., smartphone) utilized on the field or close to the drilling site. In yet other embodiments, the computing devices 54 may be communicatively coupled to the back-office computing devices or servers. The computing device 54 may be communicatively coupled to the cloud-based computing system 50 and may be configured to transmit an initialization command to the core drill 12.

Upon receiving the initialization command, the secure element 38 disposed within the core drill 12 may generate a randomized private key. In certain embodiments, the secure element 38 may only be initialized once, and only one private key may be generated per secure element 38. The private key may be a series of number or letters randomly generated based on an elliptic-curve cryptography (ECC), or any other similar technique known in the field of cryptography. The length of the private key may be any desired length. In certain embodiments, the private key may include any combination of letters, symbols, numbers, characters, etc. Further, upon receiving the initialization command, the secure element 38 may be configured to generate a public key that is associated with the generated with the private key. Both the public and private keys are stored within the secure element 38 and/or the memory 34 associated with the control circuitry 30. In particular, the secure element 38, via the communications circuitry 36, may be configured to transmit the public key to the computing device 54. The computing device 54 may store the public key along with a unique identification number (e.g., tool ID, serial number, etc.) associated with the core drill 12.

In certain embodiments, the public key is tagged with the unique identification number of the core drill 12, and may be stored within the cloud-based computing system 50, the global database 52, and/or the back-office computing devices/servers 56. Accordingly, the cloud-based computing system 50 may enable parties in multiple geographic areas to access the public key associated with the unique tool ID of the core drill 12. In certain embodiments, the public key may be openly available and stored within the network of parties utilizing the components of the drilling system 10 and/or the components of a plurality of drilling systems 10.

FIG. 3 is a method of an embodiment of the data security system 14 of FIG. 2, where the secure element 38 of the core drill 12 generates the private key and the corresponding public key. In the illustrated embodiment, a method 60 is provided. The method includes the core drill 12 receiving an initialization command from the computing device 54 (block 62). While the illustrated embodiment and the following description depicts the core drill 12, it should be noted that any component of the drilling system 10 (e.g., the water management device 19, the suction device 21, or any other auxiliary device) having the secure element 38 may be configured to receive the initialization command during an initialization phase. In certain embodiments, the initialization phase may occur during a manufacturing process of the component of the drill system 10. In other embodiments, the initialization phase may occur during on site, during repairs or maintenance, or may occur during a re-initialization phase.

The method also includes the secure element 38 of the core drill 12 generating and storing a private key (block 64), and generating, storing and transmitting the public key to the computing device 54 (block 68). In certain embodiments, the secure element 38 may store with private key within a memory within the core drill 12. It should be noted that the private key may not be available for public inspection, and might be stored within the core drill 12 without ever being transmitted or communicated. Further, the method also includes the secure element 38 of the core drill 12 generating a public key that corresponds to the private key (block 66). In certain embodiments, the private key and the corresponding public key may have similar formats and may be uniquely associated with each other. In certain embodiments, the private key may be a different format than the public key. In particular, the public key may be utilized in communications and external systems to identify the private key, and therefore the tool associated with the private key. For example, the public key may be stored within various external systems and devices, and may be utilized to authenticate and verify that various communications are transmitted by a particular tool, as further described with respect to FIG. 4.

FIG. 4 is a method of an embodiment of the data security system 14 of FIG. 2, where the computing device 54 receive the public key and stores the public key with a corresponding tool ID. In the illustrated embodiment, a method 70 is provided. The method 70 may include the computing device 54 transmitting an initialization command (block 72). While the illustrated embodiment and following description describes the core drill 12, it should be noted that any component of the drilling system 10 (e.g., the water management device 19, the suction device 21, or any other auxiliary device) may receive the initialization command from the computing device. In certain embodiments, the computing device 54 may be remote from the field, and may be in a manufacturing plant. In certain embodiments, the computing device 54 may be a mobile computing device (e.g., smartphone) utilized on the field or close to the drilling site. In yet other embodiments, the computing device 54 may be communicatively coupled to the cloud-based computing system 50, the back-office computing devices or servers.

The method may include receiving the public key from the core drill 12 (block 74). As noted above, after receiving the initialization command transmitted by the computing device 54, the core drill 12 may be configured to generate and store a private key, and generate, store, and transmit the public key to the computing device 54. The computing device 54 may be configured to receive the public key, and may tag the public key with the corresponding tool ID or unique identification number of the core drill 12 (block 76). In certain embodiments, the computing device 54 may store the public key and the corresponding tool ID within the global database 52 or the cloud-based computing system 50, such that various other systems or devices may publicly access it. In particular, the public key may be utilized in communications and external systems to identify the private key, and therefore the tool associated with the private key. By positively identifying the tool, communications between the tool and other systems/devices may be verified as reliable and trustworthy. In this manner, data communications between components of the drilling system 10 may be verified, as further described with respect to FIGS. 6 and 7.

FIG. 5 is a schematic of an embodiment of the drilling system 10 of FIG. 1, where the core drill 12 transmits a signed data package 82 to an auxiliary device 80. As noted above, the secure element 38 disposed within (and/or communicatively coupled to the control circuitry 30) the core drill 12 may be configured to generate a private and a corresponding public key during an initialization process. During operations of the drilling system 10, various communications (e.g., commands, signals, sensor information, parameters, health check, status, updates, alerts, ON/OFF, lock-down, tool ID, etc.) are transmitted between components of the drilling system 10. Further, during operations or maintenance of the drilling system 10, various communications are transmitted (e.g., commands, signals, sensor information, parameters, health check, status, updates, alerts, ON/OFF, lock-down, tool ID, etc.) between a component of the drilling system 10 and the mobile computing device 17. For these and other communications, it may be beneficial to enable data security measure such that the communications are verified before the data is processed by the receiving device.

In certain embodiments, the control circuitry 30 of a component of the drilling system 10 (e.g., the core drill 12) may be configured to generate a data package 84 of information intended to be transmitted. Before the data package 84 is transmitted to the desired destination by the communications circuitry 36, the secure element 38 of the component of the drilling system 10 (e.g., the core drill 12) may sign the data package 84 with a unique signature 86 generated by using/leveraging the private key. The signed data package 82 may then be transmitted to the desired destination, which may be, for example, the water management device 19. In certain embodiments, the desired destination may be another component of the drilling system 10 (e.g., the auxiliary components 80, the core drill 12), the mobile computing device 17, or to other remote systems (e.g., cloud-based computing system 50) via the mobile computing device 17.

After receiving the signed data package 82, the water management device 19, for example, may be configured to verify the signature 86 of the signed data package 82. In certain embodiments, the water management device 19 may already have a stored copy of the public key that corresponds to the private key of the core drill 12. In other embodiments, the water management device 19 may be configured to retrieve a copy of the public key from the cloud-based computing system 50 and/or the global database 52, via the mobile computing device 17. In other embodiments, the water management device 19 may be configured to receive a copy of the public key from the core drill 12. In particular, the water management device 19 may utilize the public key to compare and verify the signature 86 of the signed data package 82. Upon a positive verification, the water management device 19 may be configured to process the data package 84, and in some cases, execute the commands and/or signals. Without a positive verification, the water management device 19 may not act upon the data package 84 received.

FIG. 6 is a method of an embodiment of the drilling system 10 of FIG. 5, where the core drill 12 generates and transmits the signed data package 82. In the illustrated embodiment, a method 90 is provided. The method 90 includes a core drill 12 that generates a data package (block 92). As noted above, while a core drill 12 is utilized in the illustrated embodiment and description, any component of the drilling system 10 with the secure element 38 may be utilized for these methods. The method also includes the core drill generating a signature 86 for the data package 84 with the private key to generate a signed data package 82 (block 94). The method 90 also includes the core drill 12 transmitting the signed data package 82 (block 96).

FIG. 7 is a method of an embodiment of the drilling system 10 of FIG. 5, where the auxiliary device 80 receives and verifies the signed data package 84. In the illustrated embodiment, a method 100 is provided. The method 100 includes the auxiliary device 80 (e.g., the water management device 19, the suction device 21, etc.) receiving the signed data package 82 from the core drill 12 (block 102). The method 100 also includes the auxiliary device 80 utilizing the public key (associated with the private key of the core drill 12) to verify the signature of the signed data package 82 (block 104). With a positive verification, the method 100 includes processing the signed data package 82 (block 106). Without a positive verification, the method 100 includes the auxiliary device 80 not processing or acting upon the received signed data package 82.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method, comprising:
generating a data package, by control circuitry of a power tool;
generating a unique signature for the data package with a private key, wherein the private key is generated by a secure element of the power tool, and wherein the secure element is a digital key storage unit; and
transmitting the signed data package to an auxiliary device for verification.

2. A method, comprising:
receiving a signed data package, by an auxiliary device of a drilling system, wherein the signed data package is generated by a power tool;
verifying a unique signature of the signed data package with a public key, wherein the public key corresponds to a private key, and wherein the private key is generated by a secure element of the power tool, and wherein the secure element is a digital key storage unit; and
after verifying the unique signature of the signed data package with the public key, processing the signed data package.

3. The method of claim 2, wherein the power tool transmits the signed data package to an auxiliary device and the auxiliary device is a water management device.

4. The method of claim 2, wherein the power tool transmits the signed data package to an auxiliary device and the auxiliary device is a suction device.

* * * * *